United States Patent
Lindem, III et al.

(10) Patent No.: US 9,503,357 B2
(45) Date of Patent: *Nov. 22, 2016

(54) METHOD AND APPARATUS FOR LIMITING TOPOLOGY AND REACHABILITY INFORMATION IN AN OSPF AREA

(71) Applicant: Telefonaktiebolaget L M Ericsson (publ), Stockholm (SE)

(72) Inventors: Alfred C. Lindem, III, Cary, NC (US); Ing-Wher Chen, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,191

(22) Filed: Dec. 30, 2015

(65) Prior Publication Data
US 2016/0112298 A1    Apr. 21, 2016

Related U.S. Application Data

(63) Continuation of application No. 13/570,205, filed on Aug. 8, 2012, now Pat. No. 9,264,343.

(60) Provisional application No. 61/669,609, filed on Jul. 9, 2012.

(51) Int. Cl.
*H04L 12/751* (2013.01)
*H04L 12/715* (2013.01)
*H04L 12/721* (2013.01)

(52) U.S. Cl.
CPC ............ *H04L 45/025* (2013.01); *H04L 45/04* (2013.01); *H04L 45/12* (2013.01)

(58) Field of Classification Search
None
See application file for complete search history.

(56) References Cited

U.S. PATENT DOCUMENTS

| | | | | |
|---|---|---|---|---|
| 7,334,047 B1 * | 2/2008 | Pillay-Esnault | ........ | H04L 45/02 709/239 |
| 8,085,690 B1 * | 12/2011 | Leelanivas | .......... | H04L 12/4675 370/255 |
| 2003/0067925 A1 * | 4/2003 | Choe | ........................ | H04L 45/02 370/400 |
| 2007/0255812 A1 * | 11/2007 | Mirtorabi | ................ | H04L 45/02 709/220 |
| 2009/0103538 A1 * | 4/2009 | Yoshimi | ................... | H04L 12/66 370/392 |
| 2010/0061246 A1 | 3/2010 | Barnes et al. | | |

OTHER PUBLICATIONS

Moy, RFC 2323, ospf Version 2, May 1998.*

(Continued)

*Primary Examiner* — Vinncelas Louis
(74) *Attorney, Agent, or Firm* — Nicholson De Vos Webster & Elliott, LLP

(57) ABSTRACT

A network element that acts as a hub in a hub and spoke topology is configured to limit the amount of topology and reachability information that is advertised to a set of one or more remote network elements that act as one or more spokes in the hub and spoke topology in a same routing area. The network element generates a set of one or two link state advertisements (LSAs) to advertise over an interface that connects at least one of the set of remote network elements to the network element, wherein the set of LSAs includes information that describes a connection to the set of remote network elements and one or more aggregate routes. The network element advertises, during a database exchange process with the one of the set of remote network elements, the set of LSAs to the one of the set of remote network elements.

17 Claims, 8 Drawing Sheets

(56) References Cited

OTHER PUBLICATIONS

U.S. Appl. No. 13/570,205, Non-Final Office Action, Oct. 30, 2014, 50 pages.
U.S. Appl. No. 13/570,205, Final Office Action, May 27, 2015, 47 pages.
U.S. Appl. No. 13/570,205, Advisory Action, Aug. 18, 2015, 14 pages.
U.S. Appl. No. 13/570,205, Notice of Allowance, Oct. 2, 2015, 28 pages.
RFC 2328: Moy, J., "OSPF Version 2," Network Working Group, Apr. 1998, 245 pages.
RFC 3101: Murphy, P., "The OSPF Not-So-Stubby Area (NSSA) Option," Network Working Group, Jan. 2003, 34 pages.
RFC 5340: Coltun, et al., "OSPF for IPv6," Network Working Group, Jul. 2008, 95 pages.

* cited by examiner

```
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
   ⎧ |            LS age             |    Options    |       1       |
   ⎪ +-+-+-+-+-+-+-+-+-+-+-+-+-+-+-+-+-+-+-+-+-+-+-+-+-+-+-+-+-+-+-+-+
   ⎪ |                        Link State ID                          |
   ⎪ +-+-+-+-+-+-+-+-+-+-+-+-+-+-+-+-+-+-+-+-+-+-+-+-+-+-+-+-+-+-+-+-+
410⎨ |                     Advertising Router                        |
   ⎪ +-+-+-+-+-+-+-+-+-+-+-+-+-+-+-+-+-+-+-+-+-+-+-+-+-+-+-+-+-+-+-+-+
   ⎪ |                     LS sequence number                        |
   ⎪ +-+-+-+-+-+-+-+-+-+-+-+-+-+-+-+-+-+-+-+-+-+-+-+-+-+-+-+-+-+-+-+-+
   ⎩ |         LS checksum           |             length            |
    +-+-+-+-+-+-+-+-+-+-+-+-+-+-+-+-+-+-+-+-+-+-+-+-+-+-+-+-+-+-+-+-+
   ⎧ |    0    |SS|V|E|B|            0            |        # links    |
   ⎪ +-+-+-+-+-+-+-+-+-+-+-+-+-+-+-+-+-+-+-+-+-+-+-+-+-+-+-+-+-+-+-+-+
   ⎪ |                          Link ID                              |
   ⎪ +-+-+-+-+-+-+-+-+-+-+-+-+-+-+-+-+-+-+-+-+-+-+-+-+-+-+-+-+-+-+-+-+
   ⎪ |                         Link Data                             |
   ⎪ +-+-+-+-+-+-+-+-+-+-+-+-+-+-+-+-+-+-+-+-+-+-+-+-+-+-+-+-+-+-+-+-+
415⎨ |     Type      |     # TOS     |            metric             |
   ⎪ +-+-+-+-+-+-+-+-+-+-+-+-+-+-+-+-+-+-+-+-+-+-+-+-+-+-+-+-+-+-+-+-+
   ⎪ |      TOS      |        0      |           TOS  metric         |
   ⎪ +-+-+-+-+-+-+-+-+-+-+-+-+-+-+-+-+-+-+-+-+-+-+-+-+-+-+-+-+-+-+-+-+
   ⎪ |                          Link ID                              |
   ⎪ +-+-+-+-+-+-+-+-+-+-+-+-+-+-+-+-+-+-+-+-+-+-+-+-+-+-+-+-+-+-+-+-+
   ⎩ |                         Link Data                             |
    +-+-+-+-+-+-+-+-+-+-+-+-+-+-+-+-+-+-+-+-+-+-+-+-+-+-+-+-+-+-+-+-+
                                  ...
```

FIG. 4

METHOD AND APPARATUS FOR LIMITING TOPOLOGY AND REACHABILITY INFORMATION IN AN OSPF AREA

CROSS-REFERENCE TO RELATED APPLICATIONS

This application is a continuation of U.S. application Ser. No. 13/570,205, filed Aug. 8, 2012, which claims the benefit of U.S. Provisional Application No. 61/669,609, filed Jul. 9, 2012, which are hereby incorporated by reference.

FIELD

The present invention relates to the field of networking, in particular, to limiting topology and reachability information in an Open Shortest Path First (OSPF) area.

BACKGROUND

OSPF (as described in IETF (Internet Engineering Task Force) RFC (Request for Comments) 2328, RFC 5340, and RFC 3101) is a link-state routing protocol developed for Internet Protocol (IP) networks. Link-state advertisements (LSAs) are sent to all other routers within the same hierarchical area. Areas may be combined to form an AS (Autonomous System) and routers that are connected to more than one area within an AS are called area border routers (ABR). An OSPF LSA includes information on attached interfaces, metrics used, and other variables. The routers collect and compile the LSAs from other OSPF routers to create an LSDB (Link State Database). The LSDB may describe the network topology for the whole area and is used to calculate the shortest path to other routers. Routers within the same area should have identical topological databases because they receive the same LSAs. These LSDBs are called area LSDBs. ABRs have an area LSDB for each area to which they are connected.

OSPF operations use a Shortest Path First (SPF) routing algorithm that finds for a given source vertex in the graph, the path with the shortest path between that vertex and a destination. On power-up, a router initializes its routing-protocol data structures and then waits for indications from lower-layer protocols that its interfaces are functional. The OSPF Hello protocol is then used to acquire neighbors, which are other routers that have interfaces to a common link. The router exchanges hello packets with these neighbors.

Adjacent routers have synchronized area or area level LSDBs. Some routing-protocol packets are sent and received only on adjacencies. Each router periodically sends its LSAs to provide information on its adjacencies and to provide information on its state changes. This is done by flooding. From the LSDB generated from LSAs, each router calculates a shortest-path tree (SPT) with itself as root. The SPT, in turn, yields a routing table. The SPT gives the entire path to any destination network or host, although the router typically forwards a packet to the next router in the computed shortest path.

In OSPF, before two routers can announce an adjacency to each other and use their common link for forwarding data, they exchange their databases through database description (DD) packets to assure that their area LSDBs are synchronized.

OSPF offers a few simple mechanisms to aggregate and limit the amount of topology and reachability information that routers in the OSPF routing domain are required to maintain and exchange. Within an OSPF area, all routers are required to have visibility to the link state for all of the other routers in the area. On area boundaries, reachability information within the area may be aggregated with area ranges. The aggregated reachability information is then advertised into the backbone area and re-advertised by ABRs (Area Border Routers) into other areas. Two additional types of areas are defined to limit the amount of reachability information:

A Stub Area (SA) can be configured when there is a single exit point from the area through an ABR. In a SA, no AS (Autonomous System) external routes may be advertised into the stub area and OSPF reachability information from other areas may be suppressed. The one ABR for the stub area advertises a default route that is used by all routers in the area to route all AS external traffic through the ABR.

A Not-So-Stubby-Area (NSSA) as described in IETF RFC 3101 allows external routes to be imported into the stub area LSDB but only in a limited way. In an NSSA, no AS external routes from other areas are advertised but routers within the NS SA may advertise external routes to one another. ABRs advertise a default route. OSPF inter-area reachability information from other areas may be suppressed.

Many times, and particularly in hub and spoke topologies, the remote sites or spokes get much more topology information then they need. Additionally, OSPF reliable flooding will result in a significant amount of churn. This increases traffic on the network and activity in each router without improving the routing of data traffic.

SUMMARY

A method and apparatus for limiting the amount of topology and reachability information that is advertised in an OSPF area is described. A network element that acts as a hub in a hub and spoke topology is configured to limit the amount of topology and reachability information that is advertised to a set of one or more remote network elements that act as one or more spokes in the hub and spoke topology in a same routing area. The network element generates a set of one or two link state advertisements (LSAs) to advertise over an interface that connects at least one of the set of remote network elements to the network element, wherein the set of LSAs includes information that describes a connection to the set of remote network elements and one or more aggregate routes. The network element advertises, during a database exchange process with the one of the set of remote network elements, the set of LSAs to the one of the set of remote network elements.

BRIEF DESCRIPTION OF THE DRAWINGS

The invention may best be understood by referring to the following description and accompanying drawings that are used to illustrate embodiments of the invention. In the drawings:

FIG. 4 illustrates an exemplary format of a Stub-Site Router-LSA according to one embodiment;

DESCRIPTION OF EMBODIMENTS

In the following description numerous specific details, such as LSA contents, addresses, network topology, and OSPF terminology are set forth. It will be appreciated, however, by one skilled in the art that the different implementations may be practiced without such specific details. In other instances, packet structures, database structures, and communication details have not been shown in detail in order not to obscure the description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The examples described herein are presented in the context of routing in a hub-spoke network using an Interior Gateway Protocol (IGP), such as the Open Shortest Path First (OSPF) routing protocol, however, the invention is not so limited. IGPs are routing protocols used by a collection of IP networks and routers that have a common routing policy. This is referred to as an AS (Autonomous System). Routing for internetworking and communications with external networks is accomplished in OSPF using a routing database, such as a link state database (LSDB) at each router. The routing database includes area topology, such as links between routers and advertised IPv4 or IPv6 prefixes.

Figure 1:
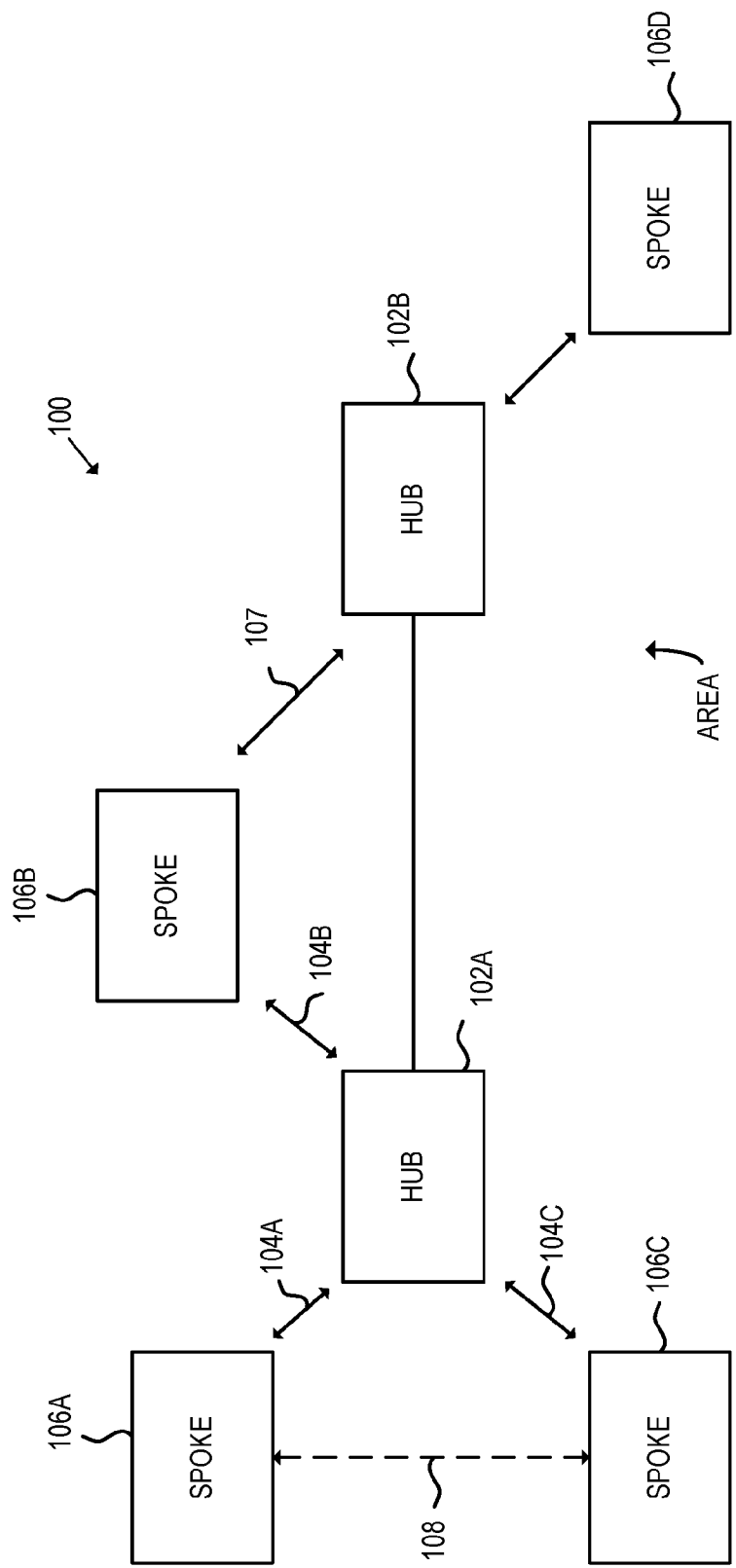
FIG. 1 illustrates an example of a topology for a hub and spoke network according to an embodiment of the invention.

FIG. 1 illustrates an example of a topology for a hub and spoke network 100. A hub and spoke network is typically a point-to-multipoint network in which one or more spoke routers 106A, 106B, 106C are connected to a hub router 102A. Hub routers 102A are connected to other hub routers 102B, which in turn are connected to other spoke routers 106B, 106D. Generally each spoke router 106A, 106B, 106C communicates 104A, 104B, 104C directly to its hub router 102A in the area in order to communicate with other spoke routers of the area. For a spoke router of one hub to communicate with a spoke router of another hub, the packets travel from spoke 106A to hub 102A to hub 102B to spoke 106D.

A spoke may have more than one router, depending on the particular area topology. The spoke site may extend out to one or many additional routers (not shown) connected in series. In actual deployments, there may be additional compromises to the hub and spoke system to enhance traffic flow for common paths and to provide redundancy in case of failure. Hub routers from the same area or different areas may have one or more spoke routers connected in common to the hub routers. As illustrated, the second hub router 102B is connected to a spoke router 106B which is also connected to the first hub router 102A. Also a spoke router 106A in an area may be interconnected 108 to another router 106C co-located at the stub site.

The communications network 100 of FIG. 1 may constitute an entire communications network or merely one area of a larger communications network. It may have many more routers and many more connections than shown. The connection nodes, which may be routers, bridges, gateways, firewalls, or switches include the hub and spoke network elements 102A, 102B, 106A, 106B, 106C, 106D.

An SPF tree computation is performed using the link-state advertisements (LSAs), which are pre-communicated to the hub routers 102A, 102B and the spoke routers 106A-106D in the hub and spoke network 100.

The communication links 104, 107, 108 may comprise any form of physical media layer, such as Ethernet, Fiber Distributed Data Interface (FDDI), or High-level Data Link Control (HDLC) serial link, wireless link, etc. The network elements as shown in more detail below may include a routing processor for determining paths and analyzing packets, memory for storing topology and routing paths, and input and output port and interfaces for receiving and sending data and management packets from and to connected networking devices.

The routing databases (not shown) in the network elements are updated by exchanging LSA packets between neighboring network elements. In a hub and spoke topology, the exchange is typically between the hub router and its spokes. These packets generally include information related to current links of the routers and are typically transferred periodically and in the event of a modification to the network topology. The routing database contains the collection of LSAs received from all of the network elements in the same area of the network. The routing databases are identical for all routers in the area, because the same information is shared among all the network elements.

However, each network element uses the network topology to generate its own topology view of the area and its own paths for routing packets. These paths correspond to the shortest path tree (SPT) and the resulting shortest path first (SPF) computation.

The amount of topology information maintained by each LSDB can become very large and the amount of resources consumed exchanging, flooding, and storing LSAs can also become very large. In order to minimize the amount of topology information that is maintained by the stub sites, each stub site could be placed into its own stub area (SA) or not so stubby area (NSSA). However, this puts constraints on network topology and administration requiring certain connection limits to be enforced or requiring network elements to act as if the topology is different than it is. This may not be desirable, convenient, or feasible from the standpoint of network administration.

In order to reduce the amount of topology information and the number of LSAs, a new OSPF stub interface type is defined for the connection of stub sites in hub and spoke topologies according to one embodiment. In the context of this description, a stub site is defined as a site that is only connected to the core of the network via one or more stub interfaces such as the spoke routers of FIG. 1.

The new interface is called a stub interface herein, although the invention is not so limited. The stub attribute is completely independent of the topological interface type, i.e., point-to-point, broadcast, NBMA (Non-broadcast multiple-access), etc and any of these interface types may also be a stub interface. The stub interface may be used to greatly limit the amount of topology information advertised to spoke site routers. The stub interface may be defined in the context of OSPF, as described herein, or any other IGP type system.

In OSPF, an interface is the connection between a router and a network. Each interface has one IP address and belongs to the area that contains the associated network. The interface is associated with a wide range of data that characterizes the router, its area, and its network. In OSPF, the interface is sometimes also referred to as a link.

Figure 2:
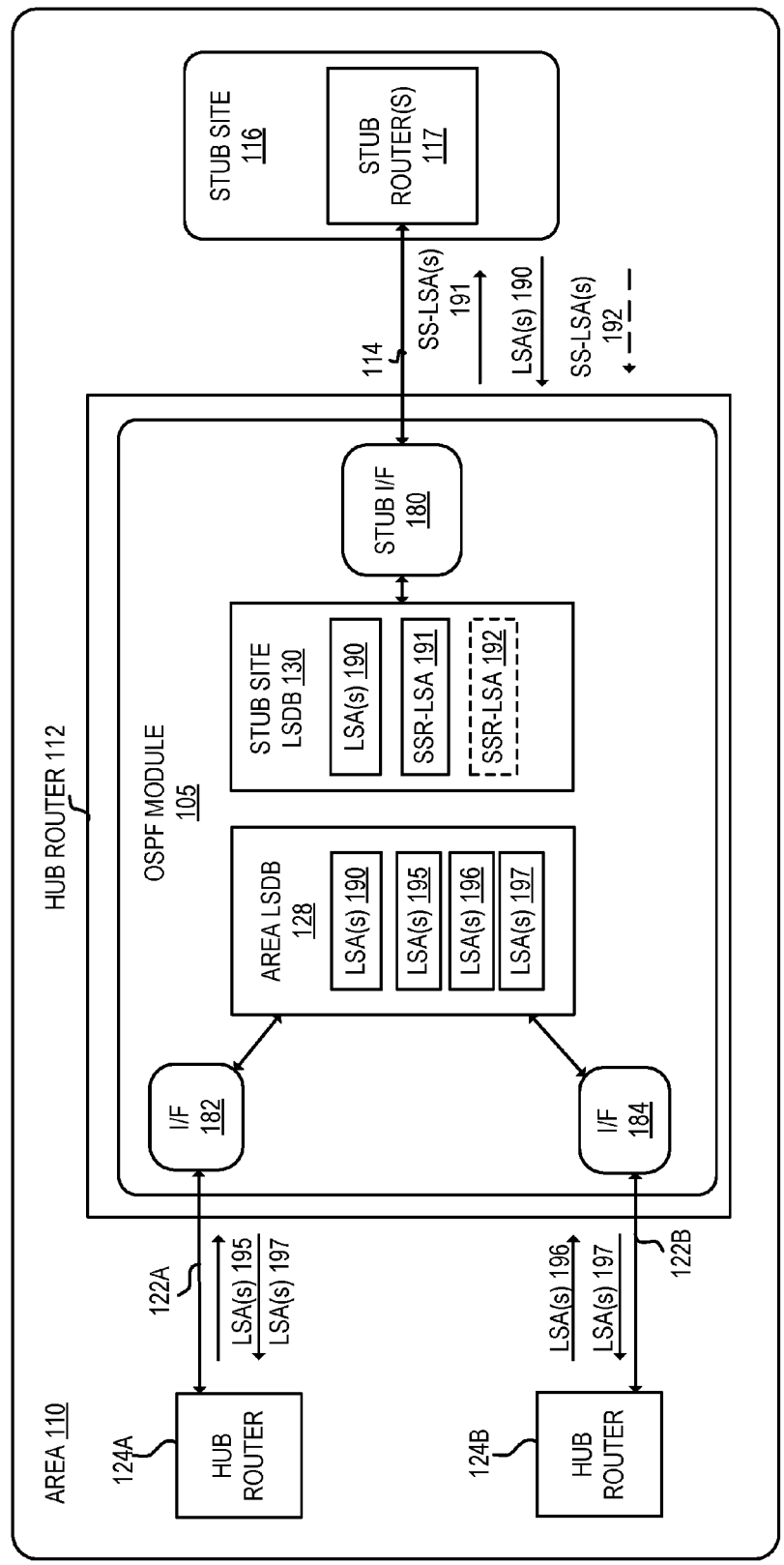
FIG. 2 is a block diagram of a hub router with connections to a stub router and other routers that is configured to limit the topology and reachability information advertised to the stub router according to an embodiment of the invention.

In FIG. 2, a hub router 112, which may be an ABR or any other hub router, is coupled through a path 114 through the stub interface 180 to a stub site 116. The stub site 116 may include one or more spoke routers. The hub router 112 is also coupled to the hub routers 124A and 124B through the paths 122A-122B and the interfaces 182 and 184 respectively. Although not illustrated in FIG. 2, the hub router 112 may also be coupled to other hub routers and/or non-stub site routers, depending on the rest of the network topology for the area. The hub routers 112, 124A-124B, and the stub site 116 are part of the same area 110. The area 110 can be any routing area type (e.g., area 0 (backbone area), standard area, stub area, totally stubby area, NSSA). In some configurations, the stub site 116 may be connected to multiple hub routers as shown in FIG. 1. For example, the stub site 116 may be multi-homed.

The hub router 112 executes an OSPF module 105. The OSPF module 105 may function accordingly to OSPFv2 (described in RFC 2328) or OSPFv3 (described in RFC 5340). The hub router 112 maintains an Area LSDB 128 and a Stub-Site LSDB 130. The Area LSDB 128 is used for SPF calculation and is used for flooding and database exchange with the hub routers 124A-124B. The Area LSDB 128 is not used for flooding and database exchange with the stub site 116. The Stub-Site LSDB 130 is scoped to the stub site 116 and is used primarily for database exchanges and flooding with the stub-site 116. As illustrated in FIG. 2, the Area LSDB 128 includes information from the LSA(s) 195 received from the hub router 124A and information from the LSA(s) 196 received from the hub router 124B. The Area LSDB 128 also includes information from the LSA(s) 197 which it generates and advertises to the hub routers 124A-124B (e.g., as a Router-LSA). The Area LSDB 128 also includes information from the LSA(s) 190, which are received from the stub site 116.

Normally, all the LSAs for the current area would be included in the database exchange process and flooded over all OSPF adjacencies. As a result all of the LSAs coming from the hub routers 124A and 124B (e.g., the LSA(s) 195 from the hub router 124A and the LSA(s) 196 from the hub router 124B) would be propagated from the hub router 112 to the stub site 116, which may be undesirable and/or unnecessary. In the case of the new OSPF stub interface, however, some of this traffic can be avoided and a limited number of LSAs may be advertised and flooded through the OSPF stub interface.

For example, in one embodiment, the OSPF router connecting the stub interface, in this case the hub router 112, only generates and advertises a set of one or two LSAs 191 over the stub interface 180 to the stub site 116. In one embodiment, this set of LSA(s) 191, which is referred herein as Stub-Site LSAs, describes the connection to the stub-site 116 and one or more aggregate routes (e.g., aggregate routes of the area 110 and possibly other areas). The aggregate route(s) may be a route with an area range (e.g., in Classless Inter-Domain Routing (CIDR) notation) and/or a default route (e.g., 0.0.0.0).

In a specific embodiment (e.g., in an OSPFv2 implementation), the hub router 112 only generates and advertises a single Router-LSA 191 over the stub interface 180 to the stub site 116 (e.g., in an OSPFv2 implementation) In one embodiment, the single Router-LSA 191 contains only the connection to the stub site 116 and one or more aggregate routes of the reachability information of the area 110 and possibly other areas.

As another specific embodiment (e.g., in an OSPFv3 implementation), the hub router 112 only generates and advertises a single Router-LSA and a single Intra-Area-Prefix-LSA over the stub interface 180 to the stub site 116 (e.g., in an OSPFv3 implementation). In this embodiment, the single Router-LSA contains only the connection to the stub site 116 and the single Intra-Area-Prefix-LSA contains only the one or more aggregate routes.

When there are multiple routers at the stub site connecting to the hub router, they may be included in the hub router's Stub-Site LSDB. They may all receive the Stub-Site LSA(s). In one embodiment, the interfaces between the routers at the stub site are not considered stub site interfaces. Accordingly, the routers at the stub site do not have any awareness of the Stub Interface and operate as if there were no Stub Interface.

The Stub-Site LSA(s) 191 may include different data depending on the type of network of the stub-site 116. The Stub-Site LSA(s) 191 describes the interfaces or links, where each link is typed according to the kind of network of the stub-site 116.

In one embodiment of the invention (e.g., in an OSPFv2 implementation), in addition to the other required and optional data, the Stub-Site LSA(s) 191 is a single Router-LSA that includes a single stub link (type 3 as defined in RFC 2328, which is a link to a stub network) for the default route (e.g., 0.0.0.0/0) or one or more stub links (type 3 links) corresponding to aggregates. A default route is one that matches every IP destination. If the stub site 116 is connected to the hub router 112 through a Point-to-Point (P2P) or Point-to-Multi-Point (P2MP) link, then the Router LSA also includes a single router link (type 1 as defined in RFC 2328, which is a P2P link) to the stub site 116 when the adjacency is full. If the stub site 116 is connected to the hub router 112 through a broadcast link or a Non-Broadcast Multiple Access (NBMA) link, then the Router LSA also includes a single network link (type 2 as defined in RFC 2328, which is a link to a transit network) to the network-LSA pseudo-node when the adjacency to the Designated Router (DR) is full. Additional data may also be included in the Stub-Site Router LSA to suit different implementations in some embodiments.

In another embodiment of the invention (e.g., in an OSPFv3 implementation), in addition to the other required and optional data, the Stub-Site LSA(s) 191 includes a Router-LSA and an Intra-Area-Prefix-LSA corresponding to that Router-LSA. The Intra-Area-Prefix-LSA includes the IPv6 default route or the aggregate route(s). Similar to the previous embodiment, if the stub site 116 is connected to the hub router 112 through a Point-to-Point (P2P) or Point-to-Multi-Point (P2MP) link, then the Router LSA also includes a single router link (type 1 as defined in RFC 2328, which is a P2P link) to the stub site 116 when the adjacency is full. If the stub site 116 is connected to the hub router 112 through a broadcast link or a Non-Broadcast Multiple Access (NBMA) link, then the Router LSA also includes a single network link (type 2 as defined in RFC 2328, which is a link to a transit network) to the network-LSA pseudo-node when the adjacency to the Designated Router (DR) is full. Thus, in an OSPFv3 implementation, the default route or aggregate route(s) are advertised in an Intra-Area-Prefix-LSA corresponding to the Router-LSA rather than as stub networks in the Router-LSA as described for OSPFv2.

The Stub-Site LSA(s) 191 are included in the OSPF database exchange through the stub interface 180 and flooded from the OSPF hub router 112 to the stub site 116. The stub site 116 receives the LSA(s) just as it does any other LSAs and no modification to the router(s) in the stub site is necessary in order to use and process the Stub-Site LSA(s).

Thus, instead of exchanging and flooding all of the LSAs of the area 110 to the stub site 116, in one embodiment the hub router 112 advertises only a limited set of one or two Stub-Site LSA(s) 191 to the stub site 116 that describes only a connection to the stub site 116 and one or more aggregate routes. This greatly reduces the amount of topology information advertised to the stub site 116 and reduces the amount of resources consumed during exchanging, flooding, and storing LSAs, without the need and administrative cost of configuring the stub site 116 as being in its own stub area or NSSA. Although the topology illustrated in FIG. 2 is for exemplary purposes and it is relatively simple; it should be understood that in practice the topology may include many more routers and many more LSAs would be advertised throughout the area; thus increasing the advantages provided through the stub interface as described herein.

The OSPF hub router 112 continues to generate its regular Router-LSA for usage in the SPF computation and advertisement over regular (non-stub) interfaces (e.g., the interfaces 182 and 184). As described above, this regular Router LSA is flooded through these interfaces 182 and 184 and is stored in the area LSDB 128.

There are situations where great benefits are realized if the hub router also floods or exchanges LSAs previously received from the stub site. For example, it may be beneficial for the hub router to flood or exchange LSAs previously received from the stub site in order to purge stale information after the adjacency with the stub-site is lost. Thus, in one embodiment, the hub router 112 also floods or exchanges LSAs previously received from the stub site 116 to the stub site 116. In order to accommodate flooding LSAs to the stub site 116 that were previously received from the stub site 116, the Stub-Site LSDB 130, which is scoped to the stub site 116, is used. OSPF defines a link-scoped database for interfaces. However, the semantics are different from the area database. Also, if multiple interfaces on the same router connect to the same stub site, a single stub site LSDB 130 may be maintained. As a result, an interface level LSDB is not reused. Rather, a separate stub-site LSDB identified by stub-site ID is maintained (e.g., the Stub-Site LSDB 130). If two stub-interfaces in the same area connect to the same site, then the same site ID may be used.

Figure 3:
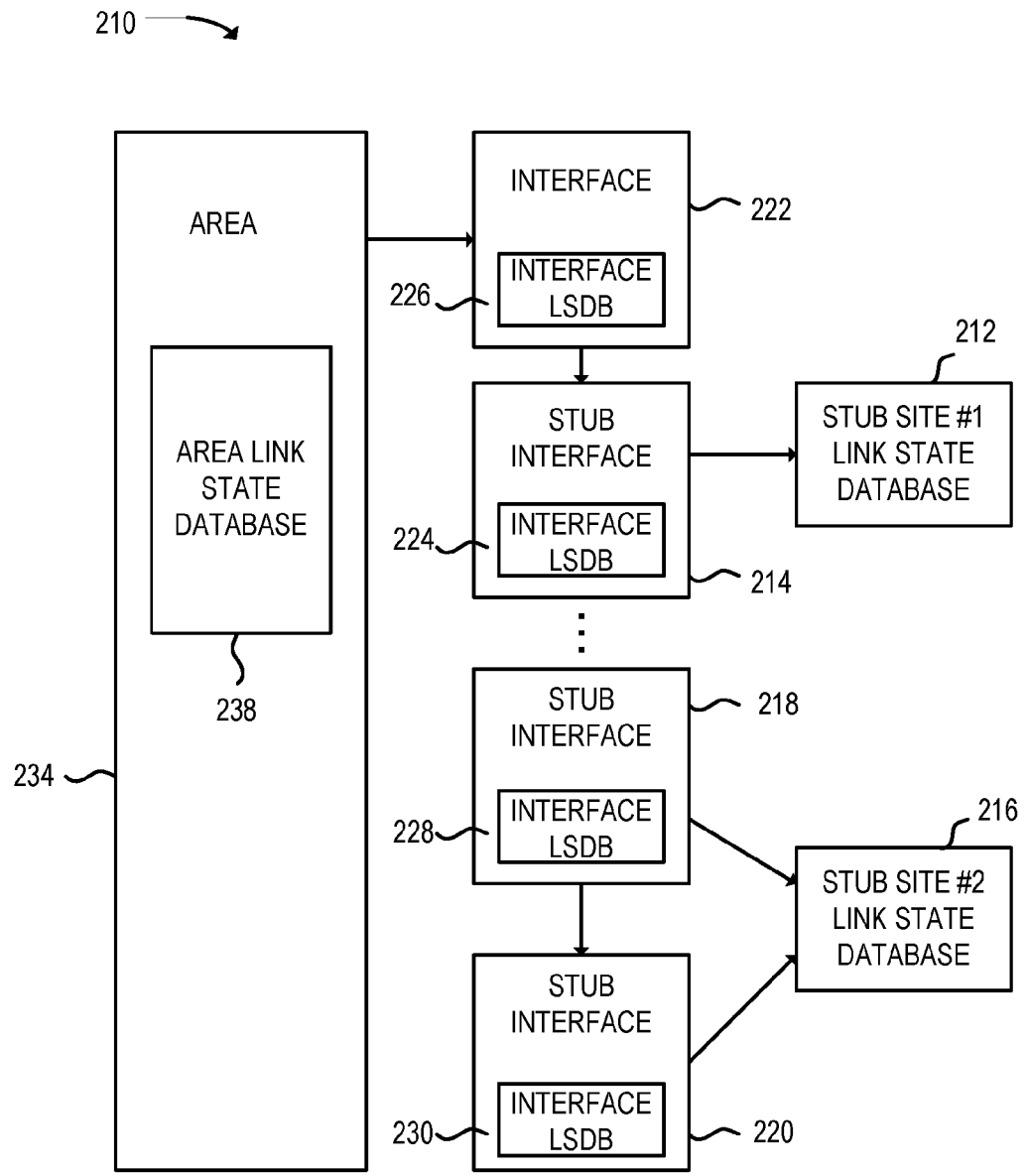
FIG. 3 is a block diagram of LSDBs and interfaces of a router in a area according to an embodiment of the invention.

FIG. 3 is a block diagram of the LSDBs and interfaces of an example central router, such as the hub router 112 of FIG. 2 or the hub routers 102A, 102B of FIG. 1. A central router of a network topology 210 of FIG. 3 has a conventional interface 222 to external routers as well as specific interfaces 214, 218, 220 to different stub sites.

Referring to FIG. 3, an area 234 has multiple interfaces, of which one interface 222 is shown. The interface includes an internal Interface LSDB 226. The router also includes interfaces to support multiple Stub Interfaces 214, 218, 220 each also with an Interface LSDB 224, 228, 230. Each Stub Interface has access to a Stub Site LSDB 212, 216 that is scoped to the corresponding stub site. In the diagram, the first Stub Interface 214 has sole access to a first Stub Site LSDB 212. This Stub Site has an ID number of 1. Other Stub Interfaces 218, 220 may share a Stub Site LSDB 216. This LSDB is for the Stub Site with ID number 2.

The Stub Site LSDB is scoped to the corresponding stub site in part in that interfaces between routers at the stub site and interfaces to other areas and other stub sites are not included.

Referring back to FIG. 2, LSAs that are received from any other router are stored in the Area LSDB 128 consistent with RFC 2328 and those LSAs that are received from the stub-site 116 are also replicated in the Stub Site LSDB 130 (with the exception of those LSAs that are Stub-Site LSA(s)). For example, the LSA(s) 190, which are received from the stub-site 116 on the stub interface 180, are stored in both the stub-site LSDB 130 and the area LSDB 128. As will be described later herein, in one embodiment if the hub router 112 receives a Stub-Site LSA from a stub-site (which is likely received as a result of that stub-site being multi-homed), then that Stub-Site LSA is not installed into the area LSDB 128. To say it another way, in one embodiment, the hub router 112 replicates the LSAs received from the stub-site 116 in both the area LSDB 128 and the Stub-Site LSDB 130, except for those LSAs that are Stub-Site LSAs, which are only installed in the Stub-Site LSDB 130. As described above, the Area LSDB 128 is still used for the Shortest Path First (SPF) calculation of the area 110 and the Stub Site LSDB 130 is used for database exchanges and flooding with the stub site 116. To minimize the size and complexity of the Stub Site LSDBs, they may be limited to only database exchanges and flooding with the respective stub site.

In some cases, a stub-site is multi-homed. For example, the stub-site may be connected to multiple hub routers. As a result, there may be Stub-Site LSA(s) from other hubs that are received at the hub router 112. This is represented in FIG. 2 as the Stub-Site LSA(s) 192. These will cause problems, if they are allowed to be flooded back to the core network since they will conflict with the hub router's normal Router-LSA. The hub routers are able to prevent these Stub-Site LSA(s) 192 from being flooded back into the core network. This can be done by not replicating the Stub-Site LSA(s) 192 into the area LSDB 128. Thus, as illustrated in FIG. 2, the Stub-Site LSA(s) 192 are stored in the stub-site LSDB 130 but are not replicated into the area LSDB 128. The Stub-Site LSA(s) can be identified without any modification to the stub site routers.

In one embodiment, a hub router identifies a Stub-Site LSA without any modification to the stub-site routers through use of a separate bit in the router bits field of the Router-LSA. Currently, the router bits V, E, and B are defined (Reference RFC 2328). This separate bit is referred to herein as the SS (Stub Site) bit, however, any other router bit name may be used. FIG. 4 illustrates an exemplary format of a Router-LSA 410 according to one embodiment. The format of the Router-LSA 410 is similar to the Router-LSA format defined in RFC 2328 (see, for example, section A.4.2 of RFC 2328), with the exception that a SS (Stub Site) bit has been added in the router bits field 415 to identify whether the Router-LSA is a Stub-Site LSA. For example, when set, the SS bit indicates that the Router-LSA is a Stub-Site LSA.

In another embodiment, instead of looking for a separate bit, the hub router identifies a Stub-Site LSA without any modification to the stub-site routers by looking for configured stub (type 3) links in received Router LSAs. Either the default (e.g., 0.0.0.0/0) stub link or configured aggregates may be used.

If an OSPF hub router receives a Router LSA that has the SS bit set or contains the configured stub (type 3) link(s), it considers that LSA to be another OSPF hub router's Stub-Site LSA. It is stored in the appropriate stub-site LSDB database (e.g., the Stub-Site LSDB 130) but is not replicated in the area LSDB 128. This prevents inconsistencies when a stub site is multi-homed to different routers.

Another advantage of the described identification of stub-site LSA(s) is that transit traffic can be prevented from traversing the stub site. Transit traffic is data traffic that is neither locally originated nor locally destined. Thus, in one embodiment, data traffic that is not originated by the stub-site or destined for the stub-site is prevented from traversing the stub site. This can be done, for example, during the SPF (Shortest Path First) calculation by applying a rule for each vertex. An example of one such rule is as follows:

```
if (
    (parent-vertex part of graph for stub-site) &&
    (vertex corresponds to Stub-Site-LSA in stub-site LSDB)
)
{
    Ignore vertex in router computation to suppress transit
    traffic;
}
```

The first condition (parent-vertex part of graph for stub-site) is easily determined by keeping track of whether or not the computing router's link corresponds to the stub-interface. The second condition (vertex corresponds to Stub-Site LSA in stub-site LSDB) may be checked by looking up the router vertex in the stub-site LSDB. Thus, if the parent-vertex is part of the graph for the stub-site and the current vertex corresponds to the Stub-Site LSA in the stub-site LSDB, that current vertex will be ignored in the SPF calculation thereby preventing transit traffic from traversing the stub-site. These conditions essentially identify and cause the link to the stub-site to be ignored for purposes of the SPF calculation installing a route traversing the stub-site.

Figure 5:
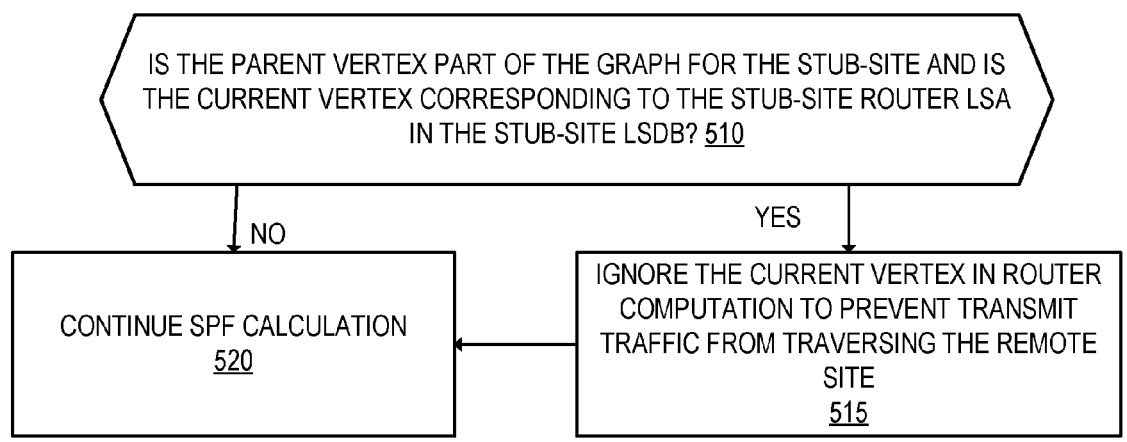
FIG. 5 is a flow diagram that illustrates exemplary operations for preventing traffic from traversing the stub-site according to one embodiment.

FIG. 5 is a flow diagram that illustrates exemplary operations for preventing traffic from traversing the stub-site according to one embodiment. In one embodiment, the operations described with reference to FIG. 5 are performed during SPF calculation by an OSPF module executing on a hub router, such as the hub router 112, and are performed for each vertex in the graph. At operation 510, a determination is made whether the parent vertex part of the graph is for the stub-site and whether the current vertex corresponds to the Stub-Site LSA in the Stub-Site LSDB. The determination of whether the parent vertex part of the graph is for the stub-site may be performed by keeping track of whether the computing router's link corresponds to the stub-interface. The determination of whether the current vertex corresponds to the Stub-Site LSA may be performed by looking up the router vertex in the stub-site LSDB. If both of these conditions are true, then flow moves to operation 515 where that current vertex is ignored in the SPF calculation to prevent transit traffic from traversing the remote site (the stub-site). If any one of those conditions are not true, then flow moves from operation 510 to operation 520, where the SPF calculation is continued if necessary for other vertexes. Flow also moves from operation 515 to operation 520.

If multiple stub sites are multi-homed to the same router or there are back-door links between stub sites, the hub router may treat the connected sites as a single remote-site. This further reduces complexity. By way of example, for the simple case of two connections in the same area and the same remote stub site, the hub router in one embodiment (e.g., in an OSPFv2 implementation) originates a single Router-LSA that contains:

1) A stub link (type 3) or links to the configured summary network (e.g., 0.0.0.0/0);
2) A router link (type 1) for the interface with the first adjacency to the stub site; and
3) A router link (type 1) for the interface with the second adjacency to the same stub site.

This is the same as the singly homed Stub-Site LSA with the addition of the additional type 1 router links. If the stub site(s) have back door links with many other stub sites connecting to one or more hub routers, in one embodiment a unique area is assigned for those interconnected sites.

The multi-homed Stub-Site LSA can be similarly modified for P2MP, multiple access, and broadcast as described above. For broadcast or NBMA interfaces, the LSA may also be constructed as described above. In the example of the broadcast or NBMA network, the type 1 link in the Stub-Site-Router-LSA is replaced with a type 2 link to the Network-LSA. Additionally, the Stub-Site LSDB may be modified to include LSAs for every router connected via the broadcast or NBMA interface.

For OSPFv3, the same approaches may be used as described above with the exception that the IPv6 default route or aggregate routes are advertised in the Intra-Area-Prefix-LSA corresponding to the Router-LSA rather than as stub networks in the Router-LSA. The type 1 links and other extensions in the OSPFv3 Router-LSA may be the same as for OSPFv2. Like the Router-LSA, the corresponding OSPFv3 Intra-Area-Prefix LSA will be installed in the Stub-Site Link State Database (LSDB) but not the Area Link State Database (LSDB).

Figure 6:
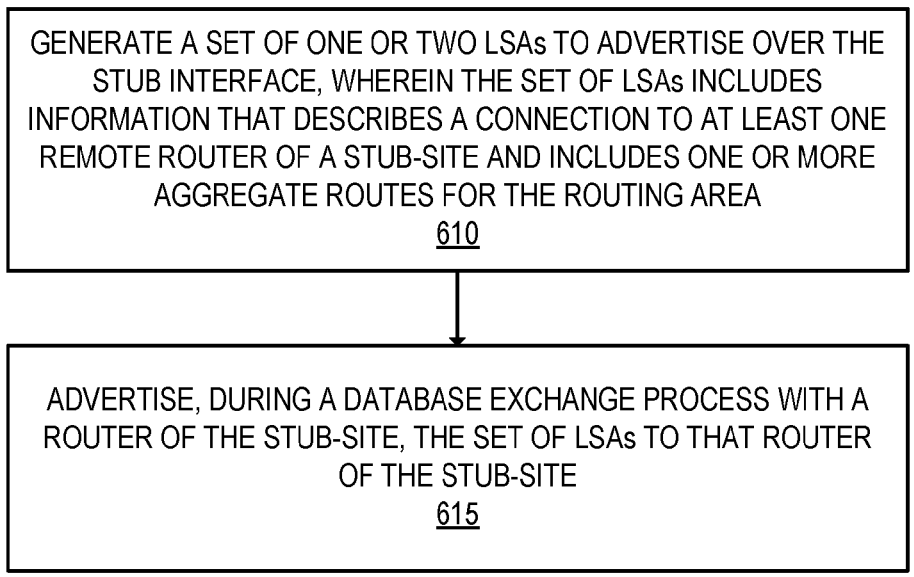
FIG. 6 is a flow diagram illustrating exemplary operations for limiting the amount of topology and reachability information that is advertised to remote routers that act as spokes in a hub and spoke topology according to one embodiment.

FIG. 6 is a flow diagram illustrating exemplary operations for limiting the amount of topology and reachability information that is advertised to remote routers that act as spokes in a hub and spoke topology according to one embodiment. In one embodiment, the operations described with respect to FIG. 6 are performed by a hub router, such as the hub router 112 illustrated in FIG. 2.

At operation 610, the hub router 112 generates a set of one or two LSAs to advertise over an interface that connects at least one of the set of remote routers of a stub-site with the hub router 112. For example, the interface is the stub interface 180 illustrated in FIG. 2. The set of LSAs includes information that describes a connection to the at least one remote router of the stub-site, and further includes one or more aggregate routes. In one embodiment, the set of one or two LSAs is a single Router-LSA (e.g., in an OSPFv2 implementation). In another embodiment (e.g., in an OSPFv3 implementation), the set of one or two LSAs includes a Router-LSA that describes the connection to the stub-site and an Intra-Area-Prefix-LSA corresponding to the Router-LSA that includes the aggregate route(s).

Flow then moves to operation 615 where the hub router 112 advertises, during a database exchange process with the remote router of the stub-site, the set of stub-site LSA(s) to that router. In one embodiment, the hub router 112 only advertises the generated LSA(s) to the remote router during the database exchange process (with the possible exception of LSAs previously received from the router(s) in the stub site).

Figure 7:
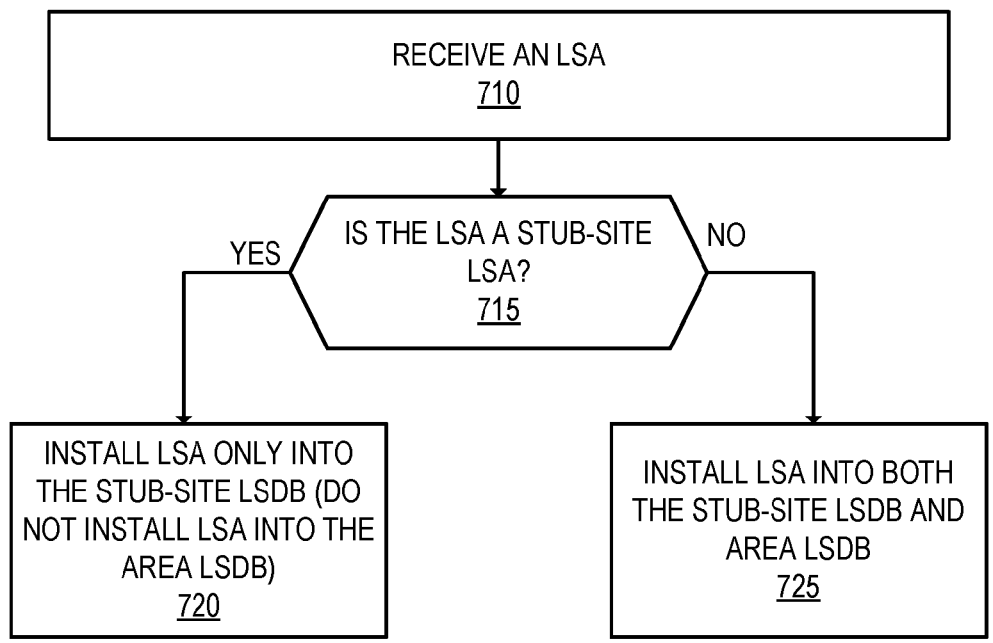
FIG. 7 is a flow diagram illustrating exemplary operations for processing LSAs and preventing Stub-Site Router-LSAs from being flooded into the core network according to one embodiment.

FIG. 7 is a flow diagram illustrating exemplary operations for processing LSAs and preventing Stub-Site LSAs from being flooded into the core network according to one embodiment. In one embodiment, the operations described with respect to FIG. 7 are performed by a hub router, such as the hub router 112 illustrated in FIG. 2.

At operation 710, an LSA is received at the hub router 112. Next, at operation 715, the hub router 112 determines whether the LSA is a stub-site LSA as defined herein. This may be done in any of a variety of different ways, such as by checking particular fields for a stub interface identifier. For example, as previously described, the hub router 112 may identify a stub-site LSA, without any modification to the stub-site routers, through use of a particular bit in the router bits field of the LSA (e.g., the SS bit as illustrated in FIG. 4). As another example, instead of looking for a separate bit, the hub router 112 identifies a Stub-Site LSA without any modification to the stub-site routers by looking for configured stub (type 3) links in received LSAs. Either the default (e.g., 0.0.0.0/0) stub link or configured aggregates may be used.

If the received LSA is a Stub-Site LSA, then flow moves to operation 720, otherwise flow moves to operation 725. At operation 720 (the LSA is a stub-site LSA), the hub router 112 installs the LSA only into the stub-site LSDB 130 (and not in the area LSDB 128). In this way, the stub site LSAs can be prevented from being flooded back into the core network (e.g., to the other hub routers 124A-B). It should be understood that identifying the stub-site LSAs is performed without any changing any of the operational code, functions, or hardware of the other stub-site routers. At operation 725 (the received LSA is not a Stub-Site LSA), the hub router 112 installs the received LSA into both the stub-site LSDB 130 and the area LSDB 128.

The operations of this and other flow diagrams are described with reference to the exemplary embodiments of the other diagrams. However, the operations of the flow diagrams can be performed by embodiments of the invention other than those discussed with reference to these other diagrams, and the embodiments of the invention discussed with reference these other diagrams can perform operations different than those discussed with reference to the flow diagrams Different embodiments of the invention may be implemented using different combinations of software, firmware, and hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

Figure 8:
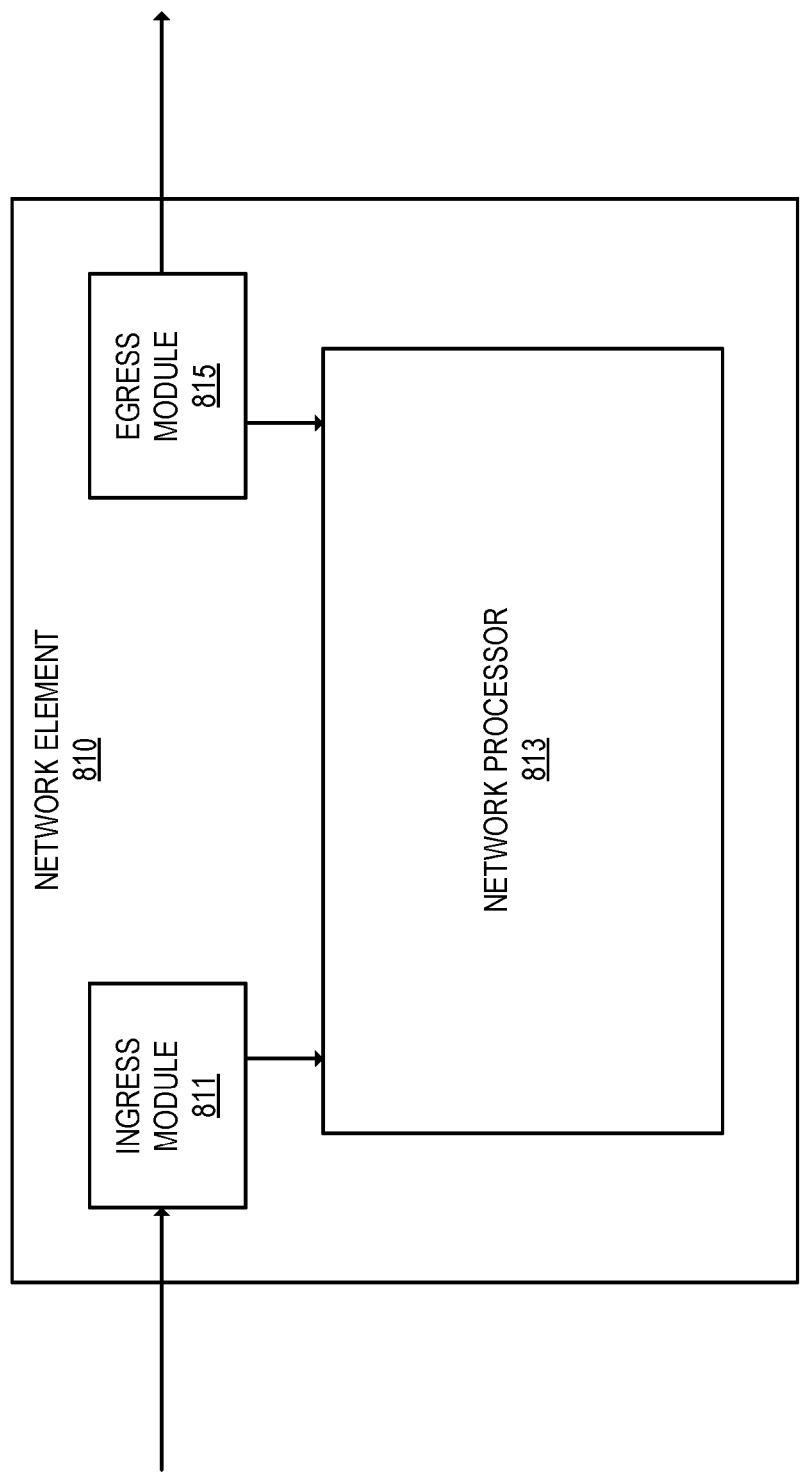
FIG. 8 is a block diagram of a network element such as a hub router having link state lists according to an embodiment of the invention.

As used herein, a network element (e.g., a router, switch, bridge) is a piece of networking equipment, including hardware and software, that communicatively interconnects other equipment on the network (e.g., other network elements, end stations). FIG. 8 is a diagram of one embodiment of a network element. The network element 810 includes an ingress module 811, an egress module 815 and a network processor 813. The ingress module 811 handles the processing of packets being received by the network element at the physical link and data link level. The egress module 815 handles the processing and data packets being transmitted by the network element at the physical link and data link level. The ingress and egress modules communicate with subscribers, edge routers, and other network elements through IPv4, IPv6, Ethernet, or any of a variety of other layer 2/layer 3 formats and protocols. The network processor 813 handles the routing, forwarding and higher level processing of the data traffic.

Figure 9:
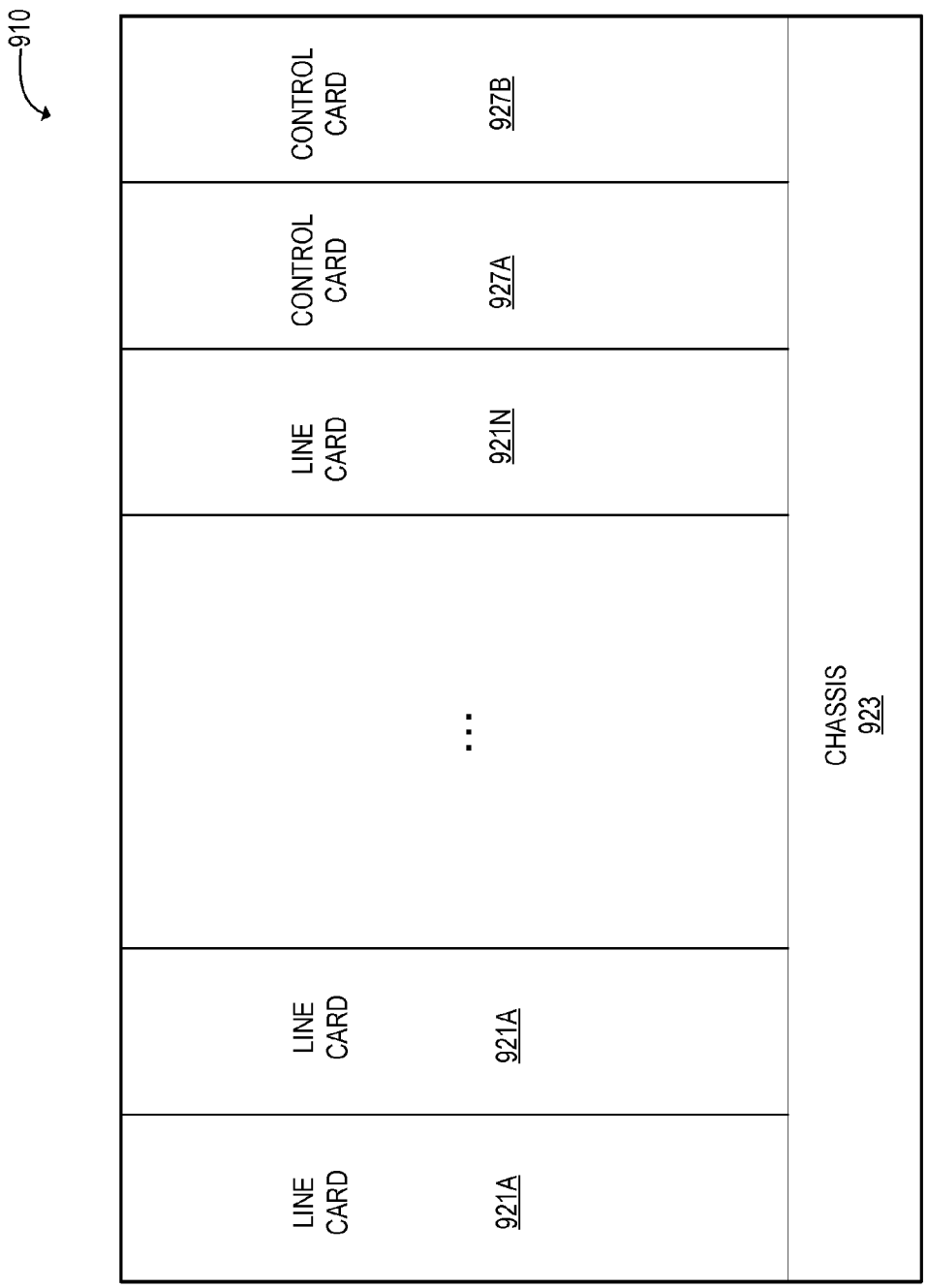
FIG. 9 is a block diagram of the network element of FIG. 8 as a group of line and data processing cards according to an embodiment of the invention.

FIG. 9 is a block diagram illustrating the network element 810 of FIG. 8 as a group of line and control cards together and the mesh to interconnect them. In one embodiment of the invention, a chassis 923 is coupled to a group of N line cards 921A-N and control cards 927A, 927B. Additional and other types of devices (not shown) may be coupled to the chassis 923. The chassis provides backplane and data plane communication between all of the cards of the network element 910.

Each of the line cards 921A-N and control cards 927A-B may include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a non-transitory machine-readable storage medium includes read only memory (ROM); random access memory (RAM); magnetic disk storage media; optical storage media; flash memory devices; while a transitory machine-readable communication medium include electrical, optical, acoustical or other form of propagated signals (e.g., carrier waves, infrared signals, digital signals, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in an Open Shortest Path First (OSPF) hub router to limit an amount of topology and reachability information that is advertised to one or more OSPF spoke routers of a stub site that are in a same routing area as the OSPF hub router, wherein each of the one or more OSPF spoke routers are not within a Stub Area (SA) or a Not-So-Stubby Area (NSSA), the method comprising:

performing a database exchange process, comprising:
transmitting, to each of the one or more OSPF spoke routers that are connected to the OSPF hub router over one of one or more stub interfaces, only a single Stub-Site Router-Link State Advertisement (Router-LSA) that describes a single stub link for a default route or one or more stub links corresponding to aggregate routes of the same routing area, wherein the single Stub-Site Router-LSA does not describe each of the directly connected links of the OSPF hub router;
transmitting, over one or more non-stub interfaces but not over the one or more stub interfaces, an OSPF Type 1 Router-LSA, wherein the OSPF Type 1 Router-LSA includes more link information than the single Stub-Site Router-LSA transmitted over the one or more stub interfaces and describes each of the directly connected links of the OSPF hub router;
receiving, over the one or more stub interfaces, a first set of one or more LSAs:
receiving, over the one or more non-stub interfaces, a second set of one or more LSAs;
installing the first set of LSAs but not the second set of LSAs in a Stub-Site Link State Database (LSDB) that is scoped only to the stub site, wherein each LSA of the first set of LSAs includes a Stub Site bit identifying the LSA as being a Stub-Site LSA; and
installing the second set of LSAs but not the first set of LSAs in an Area LSDB.

2. The method of claim 1, wherein the single Stub-Site Router-LSA comprises a Router-LSA that includes one or more bits that identify it as including only the single stub link for the default route or one or more stub links corresponding to the aggregate routes of the same routing area.

3. The method of claim 1, wherein each of the one or more OSPF spoke routers are not aware that they are connected to the OSPF hub router over the one or more stub interfaces.

4. The method of claim 1, further comprising:
receiving, over the one or more stub interfaces, a third set of one or more LSAs;
receiving, over the one or more interfaces, a fourth set of one or more LSAs;
installing both the third set of LSAs and the fourth set of LSAs in the LSDB that is scoped only to the stub site; and
installing the fourth set of LSAs but not the third set of LSAs in the Area LSDB.

5. The method of claim 4, wherein said installing of the third set of LSAs in the Stub-Site LSDB but not in the Area LSDB occurs responsive to determining, by the OSPF hub router, that the third set of LSAs are Stub-Site LSAs.

6. The method of claim 5, wherein said determining that the third set of LSAs are Stub-Site LSAs includes identifying one or more bit values within each LSA of the third set of LSAs.

7. The method of claim 1, further comprising:
during a Shortest Path First (SPF) calculation for the same routing area, ignoring the one or more stub interfaces for purposes of the SPF calculation to suppress transit traffic from traversing the stub site, wherein the transit traffic is traffic that is neither originated within the routing area or destined within the routing area.

8. A method in an Open Shortest Path First (OSPF) hub router to limit an amount of topology and reachability information that is advertised to an OSPF spoke router in a same routing area as the OSPF hub router, wherein the OSPF spoke router is not within a Stub Area (SA) or a Not-So-Stubby Area (NSSA), the method comprising:

performing a database exchange process, comprising:
transmitting, to each of the one or more OSPF spoke routers that are connected to the OSPF hub router over a one or more stub interfaces, only a single Stub-Site Router-Link State Advertisement (Router-LSA) and a single Intra-Area-Prefix-LSA, wherein the single Stub-Site Router-LSA describes a single stub link for a default route and wherein the single Intra-Area-Prefix-LSA includes an Internet Protocol version 6 (IPv6) default route or one or more stub links corresponding to aggregate routes of the same routing area, wherein the single Stub-Site Router-LSA and the single Intra-Area-Prefix-LSA collectively do not describe each of the directly connected links of the OSPF hub router;
transmitting, over one or more non-stub interfaces but not over the stub interface, an OSPF Type 1 Router-LSA, wherein the OSPF Type 1 Router-LSA includes more link information than the single Stub-Site Router-LSA transmitted over the stub interface and describes each of the directly connected links of the OSPF hub router;
receiving, over the one or more stub interfaces, a first set of one or more LSAs:
receiving, over the one or more non-stub interfaces, a second set of one or more LSAs:
installing the first set of LSAs but not the second set of LSAs in a Stub-Site Link State Database (LSDB) that is scoped only to the stub site, wherein each LSA of the first set of LSAs includes a Stub Site bit identifying the LSA as being a Stub-Site LSA; and
installing the second set of LSAs but not the first set of LSAs in an Area LSDB.

9. The method of claim 8, wherein each of the one or more OSPF spoke routers are not aware that they are connected to the OSPF hub router over the one or more stub interfaces.

10. The method of claim 8, further comprising:
receiving, over the one or more stub interfaces, a third set of one or more LSAs;
receiving, over the one or more interfaces, a fourth set of one or more LSAs;
installing both the third set of LSAs and the fourth set of LSAs in the LSDB that is scoped only to the stub site; and
installing the fourth set of LSAs but not the third set of LSAs in the Area LSDB.

11. The method of claim 10, wherein said installing of the third set of LSAs in the Stub-Site LSDB but not in the Area LSDB occurs responsive to determining, by the OSPF hub router, that the third set of LSAs are Stub-Site LSAs.

12. The method of claim 11, wherein said determining that the third set of LSAs are Stub-Site LSAs includes identifying one or more bit values within each LSA of the third set of LSAs.

13. The method of claim 8, further comprising:
during a Shortest Path First (SPF) calculation for the same routing area, ignoring the one or more stub interfaces for purposes of the SPF calculation to suppress transit traffic from traversing a stub site, wherein the transit traffic is traffic that is neither originated within the routing area or destined within the routing area.

14. A non-transitory computer-readable storage medium having instructions which, when executed by one or more processors of a device cause the device to implement an Open Shortest Path First (OSPF) hub router that performs operations to limit an amount of topology and reachability information that is advertised to one or more OSPF spoke routers of a stub site that are in a same routing area as the OSPF hub router, wherein each of the one or more OSPF spoke routers are not within a Stub Area (SA) or a Not-So-Stubby Area (NSSA), the operations comprising:
  performing a database exchange process, comprising:
    transmitting, to each of the one or more OSPF spoke routers that are connected to the OSPF hub router over one of one or more stub interfaces, only a single Stub-Site Router-Link State Advertisement (Router-LSA) that describes a single stub link for a default route or one or more stub links corresponding to aggregate routes of the same routing area, wherein the single Stub-Site Router-LSA does not describe each of the directly connected links of the OSPF hub router;
    transmitting, over one or more non-stub interfaces but not over the one or more stub interfaces, an OSPF Type 1 Router-LSA, wherein the OSPF Type 1 Router-LSA includes more link information than the single Stub-Site Router-LSA transmitted over the one or more stub interfaces and describes each of the directly connected links of the OSPF hub router;
    receiving, over the one or more stub interfaces, a first set of one or more LSAs;
    receiving, over the one or more non-stub interfaces, a second set of one or more LSAs;
    installing the first set of LSAs but not the second set of LSAs in a Stub-Site Link State Database (LSDB) that is scoped only to the stub site, wherein each LSA of the first set of LSAs includes a Stub Site bit identifying the LSA as being a Stub-Site LSA; and
    installing the second set of LSAs but not the first set of LSAs in an Area LSDB.

15. The non-transitory computer-readable storage medium of claim 14, wherein the operations further comprise:
  receiving, over the one or more stub interfaces, a third set of one or more LSAs;
  receiving, over the one or more interfaces, a fourth set of one or more LSAs;
  installing both the third set of LSAs and the fourth set of LSAs in the LSDB that is scoped only to the stub site; and
  installing the fourth set of LSAs but not the third set of LSAs in the Area LSDB.

16. A non-transitory computer-readable storage medium having instructions which, when executed by one or more processors of a device cause the device to implement an Open Shortest Path First (OSPF) hub router that performs operations to limit an amount of topology and reachability information that is advertised to one or more OSPF spoke routers of a stub site that are in a same routing area as the OSPF hub router, wherein each of the one or more OSPF spoke routers are not within a Stub Area (SA) or a Not-So-Stubby Area (NSSA), the operations comprising:
  performing a database exchange process, comprising:
    transmitting, to each of the one or more OSPF spoke routers that are connected to the OSPF hub router over one or more stub interfaces, only a single Stub-Site Router-Link State Advertisement (Router-LSA) and a single Intra-Area-Prefix-LSA, wherein the single Stub-Site Router-LSA describes a single stub link for a default route and wherein the single Intra-Area-Prefix-LSA includes an Internet Protocol version 6 (IPv6) default route or one or more stub links corresponding to aggregate routes of the same routing area, wherein the single Stub-Site Router-LSA and the single Intra-Area-Prefix-LSA collectively do not describe each of the directly connected links of the OSPF hub router;
    transmitting, over one or more non-stub interfaces but not over the stub interface, an OSPF Type 1 Router-LSA, wherein the OSPF Type 1 Router-LSA includes more link information than the single Stub-Site Router-LSA transmitted over the stub interface and describes each of the directly connected links of the OSPF hub router;
    receiving, over the one or more stub interfaces, a first set of one or more LSAs:
    receiving, over the one or more non-stub interfaces, a second set of one or more LSAs;
    installing the first set of LSAs but not the second set of LSAs in a Stub-Site Link State Database (LSDB) that is scoped only to the stub site, wherein each LSA of the first set of LSAs includes a Stub Site bit identifying the LSA as being a Stub-Site LSA; and
    installing the second set of LSAs but not the first set of LSAs in an Area LSDB.

17. The non-transitory computer-readable storage medium of claim 16, wherein the operations further comprise:
  during a Shortest Path First (SPF) calculation for the same routing area, ignoring the one or more stub interfaces for purposes of the SPF calculation to suppress transit traffic from traversing the stub site, wherein the transit traffic is traffic that is neither originated within the routing area or destined within the routing area.

* * * * *